United States Patent [19]
Ono et al.

[11] 3,962,396
[45] June 8, 1976

[54] PROCESS FOR MANUFACTURING A TRIPLE-WALL CONTAINER

[75] Inventors: Katuya Ono, Gifu; Koji Kozuka; Yoshiyuki Komuro, both of Nagoya, all of Japan

[73] Assignee: Toray Industries, Inc., Tokyo, Japan

[22] Filed: Mar. 7, 1974

[21] Appl. No.: 448,965

[30] Foreign Application Priority Data
Mar. 13, 1973 Japan.............................. 48-28555

[52] U.S. Cl................................. 264/98; 264/173; 425/DIG. 234
[51] Int. Cl.² ........................................ B29C 17/07
[58] Field of Search ................. 264/89, 90, 95, 98, 264/99, 171, 173; 425/DIG. 234

[56] References Cited
UNITED STATES PATENTS
| | | | |
|---|---|---|---|
| 3,457,337 | 7/1969 | Turner................................ | 264/98 |
| 3,819,792 | 6/1974 | Ono et al....................... | 264/173 X |

Primary Examiner—Jan H. Silbaugh
Attorney, Agent, or Firm—Paul & Paul

[57] ABSTRACT

A process for manufacturing a thermoplastic polymer container having a triple-wall structure is provided in which the outer and inner laminates are composed of an olefin polymer and the medial laminate is composed of polyamide. The medial polyamide laminate is characterized as containing, incorporated therein, 3 to 45% by weight of an ethylene copolymer containing 0.1 to 10% by mole, in polymerized form, of at least one metal salt of acrylic or methacrylic acid, and having a thickness of 2 to 30% by weight based on the total thickness of the three laminates. The container is manufactured by extruding the polymer melts while the three independent streams of the polymer melts to be formed into the three laminates are joined together within a die such that the thickness of said medial laminate is 2 to 30%, based on the total thickness of the three laminates, and then blow-molding the extruded composite polymer tube into the shape of a container.

6 Claims, 3 Drawing Figures

PROCESS FOR MANUFACTURING A TRIPLE-WALL CONTAINER

BACKGROUND OF THE INVENTION

This invention relates to a process for manufacturing a container of thermoplastic materials, having a triple-wall structure wherein one laminate is composed of a thermoplastic material differing in chemical and physical properties from the other laminates.

Polyethylene, i.e., one of the typical polyolefin resins, has been widely used for the production of shaped articles such as blow-molded containers because polyethylene is excellent with regard to chemical resistance, impact resistance and flexibility at low temperature, and moisture resistance. Polyethylene is, however, poor with regard to resistance to the transmission therethrough of chemicals such as halogenated hydrocarbons, alcohols, ethers and ketones. For example, the transmission rate of gasoline through polyethylene is scores of times that through nylon-6. This results in the disadvantage that the thickness of the polyethylene vessel used for storing for example gasoline must be increased to a great degree. Further, polyethylene is inferior in resistance to the transmission therethrough of gases other than steam, such as oxygen, carbon dioxide and nitrogen and, accordingly, it cannot be used practically as a container for storing oxidizable, perishable or discolorable substances.

Polyamide resins also have a serious defect in that they exhibit a high transmission rate of water vapour therethrough. However, they do not have the polyethylene defects mentioned above in that they do not exhibit a high transmission rate of such substances as the above-listed chemicals, gases and gasoline.

Thus, if a combination of both the polymers is used as a raw material for a shaped article, it can be naturally expected that plastic shaped articles having characteristics satisfactory from the point of view of practical use are obtainable, which characteristics are not possessed by any plastic articles shaped from the single polymer component. In order to realize this expectation, some proposals have heretofore been made which include, for example, shaping a mixture of polyethylene and polyamide; melt-extruding the two polymers through one annular orifice to form a composite tube composed of at least two tubular laminates, as disclosed in U.S. Pat. No. 3,457,337, and; melt-extruding polyethylene and polyamide through concentrically positioned outer and inner annular orifices and then bringing the extruded two tubes into intimate surface engagement by introducing air inside the inner tube, as disclosed in U.S. Pat. No. 3,082,484. Of these proposals, the procedure of producing a composite tube of the two polymer tubular laminates is advantageous from the point of view that the container has the expected good characteristics resulting from the combination of polyamide and polyethylene. However, the combination of polyamide and polyethylene has the defect that a strong bonding strength is not obtainable and this is unsatisfactory from the point of view of practical use because a strong bonding strength is required particularly at the pinched-off area during the blow-molding operation. This poor bonding strength is due to the fact that polyolefin is non-polar and poor in compatibility with polyamide.

In order to provide a laminated article comprised of polyolefin and other thermoplastic polymers, having a strong bonding strength, it has been proposed to apply a binder comprised of modified olefin polymers such as a copolymer of a predominant amount of ethylene and a minor amount of a modifier such as vinyl acetate, and unsaturated carboxylic acids such as acrylic acid and methacrylic acid and their derivatives, or to employ such modified olefin polymers as the polyolefin component to be laminated with the other thermoplastic polymer. However, these proposals are also unsatisfactory in the points that the lamination procedure is complex, or costly because the modified olefin polymers are expensive, and the resulting bonding strength is not sufficiently improved.

Further, it has been proposed to melt-extrude a composite tube comprised of two tubular laminates, one being polyamide and the other being a mixture of polyolefin and a modified ethylene polymer such as an ethylene-zinc methacrylate copolymer, while the two independent streams of the polymer melts are joined together within a die, followed by the blow-molding, as disclosed in U.S. Pat. No. 3,819,792.

However, such container having a double-wall structure still has the following defects. In the case where the inner laminate is polyamide and the outer laminate is the polyolefin mixture, the containers is not satisfactory suitable for storing foods from a sanitary point of view because: firstly, polyamide usually contains a minor quantity of the low molecular weight component which tends to migrate into the foods, and; secondly, polyamide is liable to be penetrated by water contained in the foods and, hence, the bonding strength between the polyamide inner layer and the polyolefin mixture outer layer gradually decreases over a lengthy period of use, although the container is excellent with regard to resistance to the transmission therethrough of gasoline. In contrast, in the case where the outer laminate is polyamide and the inner is the polyolefin mixture, the outer laminate of the container is liable to absorb water in the air and, hence, gas transmission through the container decreases to a degree, for example, such that transmission rates of gases such as oxygen, carbon dioxide and nitrogen in air of an equilibrium moisture content are approximately twice those in the absolutely dried air. Further, when the composite tube of the two polymer laminates, i.e., polyamide and the polyolefin mixture, is extruded through a die, melt of the polyamide tends to stick to the contacting surface of the outlet of the die and damages the appearance of the parison and hence, the product. This is especially noticeable either when the balance between the flow rates of the two polymer melts is lost or when the inner pressure in the die excessively increases.

SUMMARY OF THE INVENTION

Therefore, it is an object of the present invention to provide a process for manufacturing a container of thermoplastic polymer materials, having a multi-wall structure in which adjacent polymer laminates are bonded with one another with an improved bonding strength.

It is another object of the present invention to provide a process for manufacturing a container of thermoplastic polymer materials which possesses a well-balanced and enhanced resistance to the transmission of gases, moisture, gasoline and chemicals therethrough.

It is still another object of the present invention to provide a process for manufacturing such a container of thermoplastic polymer materials in which a parison of the polymer laminates, not having been disfigured, is stably formed from the polymer, melts and, hence, by which a container of attractive appearance is obtainable.

Other objects and advantages will be apparent from the following detailed description of the invention.

In accordance with the present invention, there is provided a thermoplastic polymer container having a triplewall structure comprised of three closely adherent laminates, characterized in that the medial laminate is composed of a mixture of (i) 55 to 97% by weight of polyamide and (ii) 3 to 45% by weight of an ethylene copolymer containing 0.1 to 10% by mole, in polymerized form, of at least one selected from metal salts of acrylic acid and methacrylic acid, and the outer and inner laminates are composed of an olefin polymer; and the thickness of said medial laminate is 2 to 30% based on the total thickness of the three laminates.

There is also provided a process for manufacturing a thermoplastic polymer container having a triple-wall structure which comprises melt-extruding a composite plastic tube comprised of three closely adherent tubular laminates, the medial laminate being composed of a mixture of (i) 55 to 95% by weight of polyamide and (ii) 3 to 45% by weight of an ethylene copolymer containing 0.1 to 10% by mole, in polymerized form, of at least one selected from metal salts of acrylic acid and methacrylic acid, and the outer and inner laminates being composed of an olefin polymer, while the three independent streams of the polymer melts are joined together within a die such that the thickness of said medial laminate is 2 to 30% based on the total thickness of the three laminates; and then blow-molding the composite plastic tube into the shape of a container.

BRIEF EXPLANATION OF THE DRAWINGS

In the accompanying drawings.

DETAILED DESCRIPTION OF THE INVENTION AND DESCRIPTION OF PREFERRED EMBODIMENT

Figure 1:
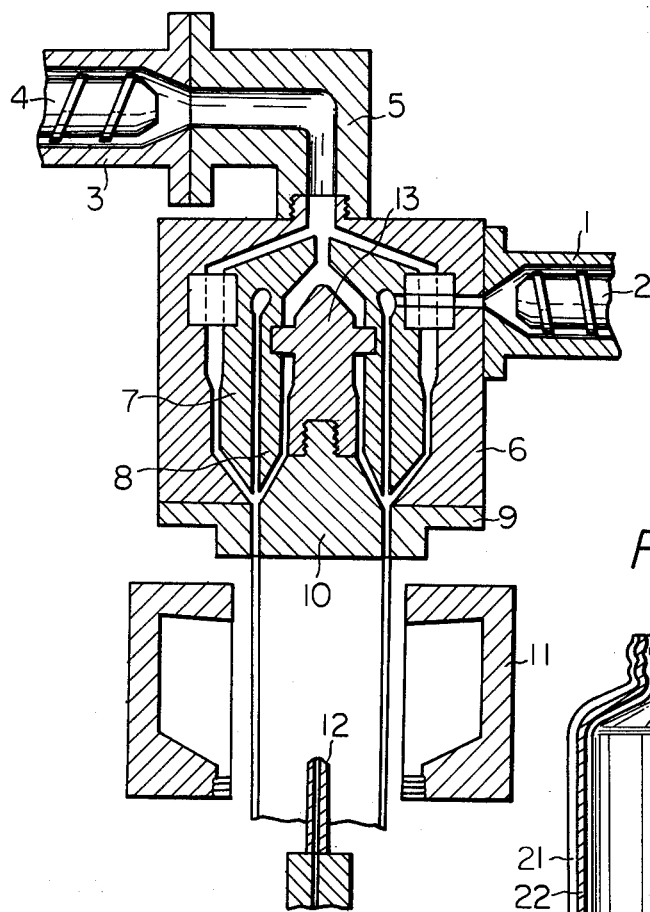
FIG. 1 is a vertical sectional view of an apparatus for the practice of the process of the present invention.

Advantages of the container manufactured by the process of the present invention are summarized as follows. First, the container of the invention possesses an improved resistance to the transmission of various gases and other substances therethrough as compared with known containers having a double-wall, e.g., polyamide and an olefin polymer, structure, considering the same wall thickness. Secondly, adjacent polymer laminates are bonded with one another with an improved bonding strength. This is surprising because even when a modified ethylene polymer is incorporated into the polyamide component in the manufacture of a double-wall container comprising polyamide and polyolefin laminates, such an improved bonding strength is not obtainable. Thirdly, the container of the invention is economically advantageous because the outer and inner laminates are composed of polyolefin which is less expensive than polyamide used in one of the laminates of the conventional double-wall container and only the thin medial laminate of polyamide incorporated with a modified ethylene copolymer is more expensive than the conventionally used laminates. The thickness of the polyamide medial laminate in the triple-wall container of the invention is 2 to 30% based on the total thickness of the polymer laminates, at which thickness a maximum strength is obtainable to our surprise. Fourthly, a polyamide melt, although it generally tends to stick to the die and damage the appearance of the extruded parison, does not exercise a harmful influence on the parison because the polyamide melt is sandwiched between olefin polymer melts at the outlet of the die and, hence, does not stick to the die. This results in a container with an attractive appearance.

An olefin polymer, which composes the outer and inner laminates of the container having a triple-wall structure, includes for example low, medium or high density polyethylene, polypropylene, polybutene-1 and olefin copolymers such as ethylene-propylene copolymer, and the like. These may be used alone or in combination with each other.

Polyamide, which composes the medial laminate of the container having a triple-wall structure, includes those generally employed for moldings, for example, nylon-6, nylon-66, nylon-12, nylon-11, nylon-610 and nylon-612. These may also be used alone or in combination with each other. A combination of low or medium density polyethylene and nylon-6 is most preferable from cost considerations.

An ethylene copolymer, which is used as a blend with polyamide, is a copolymer consisting essentially of 90 to 99.9% by mole of ethylene and 0.1 to 10% by mole of at least one selected from metal salts of acrylic acid or methacrylic acid. The metal is at least one selected from sodium, potassium, lithium, zinc, and copper. Of these metal salts, zinc methacrylate is most preferable.

The amount of the ethylene copolymer to be blended with polyamide is 3 to 45% by weight, preferably 5 to 30% by weight, based on the weight of the blend. When the amount is less than 3% by weight, the polymer blend laminate does not exhibit an improved bonding strength to olefin polymer laminates. In contrast, when the amount is more than 45% by weight, the resulting container is inferior in resistance to the transmission of oxygen gas therethrough.

The gas transmission rate through the ethylene copolymers is approximately equal to that through the olefin polymers and approximately 100 times that through polyamide. It is surprising, however, that the gas transmission rate through a blend of the ethylene copolymer and polyamide resembles that through the polyamide provided the blend comprises not more than 45% by weight of the modified ethylene polymer. This is presumed to be due to the mixed phase formed in the polymer blend laminate.

The thickness of the medial laminate, i.e. the polymer blend laminate, should be 2 to 30%, preferably 3 to 20% based on the total thickness of the three laminates. When the thickness of the medial laminate exceeds 30% of the total thickness, bonding strength between the medial laminate and the adjacent olefin polymer laminates is poor and the parison to be formed is poor in stability in shape, although the resulting container is superior in resistance to gas transmission. In contrast, when the thickness of the medial laminate is less than 2% of the total thickness, it is difficult to make the thickness of the polymer laminates uniform in the circumferential direction of the die and the resulting container is poor in resistance to gas transmission, although bonding strength between the medial laminate and the adjacent olefin polymer laminates increases. Usually, the thickness of the medial laminate is more than 5 microns, preferably 10 microns.

Suitable thickness of the outer and inner olefin polymer laminates varies depending upon the thickness of the medial laminate. It is preferable that the thickness of the outer olefin polymer laminate is greater than that of the inner olefin polymer laminate because the container possesses a pinched-off area of an improved bonding strength and is superior in resistance to gas transmission.

If desired, various additives such as heat stabilizers, colorants and antioxidants may be incorporated into both or either of the olefin polymer laminates or the polyamide laminate. Fillers such as, for example, glass fibers, asbestos, talc, calcium silicate, potassium titanate whisker may be incorporated similarly. The incorporation of such fillers improves the stability in shape of parison, the bonding strength between the adjacent polymer laminates and rigidity of the container.

Apparently the particular manner whereby the ethylene copolymer is incorporated into the polyamide is not critical. Two methods may be employed, one comprising blending the two polymers by a dry-blend procedure followed by directly feeding the blend into the hopper of the shaping extruder and the other comprising roughly blending the two polymers and then uniformly blending them by kneading using a pelletizer prior to feeding the blend to the shaping extruder. The former method is more preferable than the latter.

It is preferable that the olefin polymer to be formed into the outer and inner laminates and the blend of polyamide and the ethylene copolymer to be formed into the medial laminate are independently molten in the respective extruders, and that the three streams of the polymer melts are joined together within one die in a manner such that the melt of the blend of polyamide and the ethylene copolymer is sandwiched by the two streams of the olefin polymer melt. This method results in a container having an improved bonding strength between the adjacent laminates as compared with a container prepared by adhering the respective laminates to one another after extrusion out of a die.

The particular manner whereby the composite tube having a triple-wall structure extruded from an annular orifice of the die is shaped into a container is not critical, and any conventional blow-molding procedures may be employed.

The invention is further illustrated with reference to the accompanying drawings.

In FIG. 1, showing one preferred blow-molding apparatus used in the practice of the present invention, an olefin polymer to be formed into the outer and inner laminates and a blend of polyamide and the ethylene copolymer are separately fed into extruders 3 and 1, respectively, and kneaded by screws 4 and 2, respectively.

The olefin polymer melt flow from the extruder 3 is discharged therefrom through a connecting elbow 5 to a die assembly. In the die assembly, the melt flow is divided into two, one flowing into an outer annular passage formed between a die body 6 and an intermediate die member 7 and the other flowing into an inner annular passage formed between an inner intermediate die member 8 and a central member 13. The melt flow of the blend of polyamide and the ethylene copolymer from the extruder 1 is discharged therefrom to the die assembly and, in the die assembly flows into an annular passage formed between the intermediate die member 7 and the inner intermediate die member 8. The three streams of polymer melts flowing through the above-mentioned conically disposed three annular passages are joined together under a predetermined pressure, and then extruded from an annular orifice formed between an inner diameter-defining member 10 and an outer diameter-defining member 9 to form a tubular parison of a three-wall structure.

The parison is then clamped-off or pinched-off by a pair of blow-mold bodies 11 and shaped into a container while air of a predetermined pressure is blown into the parison through a compressed air blowing nozzle 12.

Various modifications may be made regarding the above-mentioned manner of practicing the invention. For example, an accumulator device may be employed as an attachment to the extruding apparatus thereby to increase the extrusion rate of parison or enable the production of a container larger in volume. The composite polymer tube as extruded may be cooled without continued blow-molding, and later subjected to heating and blow-molding.

Figure 2:
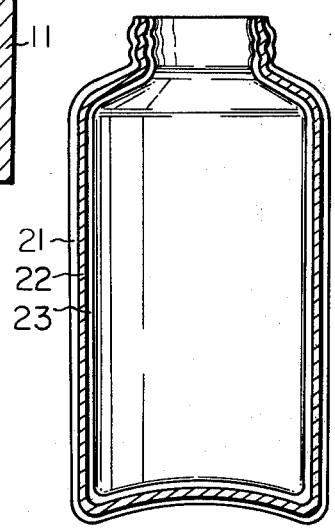
FIG. 2 is a vertical sectional view of a blow-molded container having a triple-wall structure prepared by the apparatus shown in FIG. 1.

The container so manufactured has a three-wall structure, the cross sectional view of which is shown in FIG. 2, which is composed of the outer and inner olefin polymer laminates 21 and 23 and the medial polyamide blend laminate 22. The triple-wall container has the advantages mentioned hereinbefore and is useful as a receptacle for gasoline and other oily materials and various foods such as mayonnaise and catchup.

The following examples are further illustrative of the invention, and it will be understood that the invention is not limited to the specific examples.

In the examples, all % are by weight unless otherwise specified. The oxygen gas transmission rate was determined at a temperature of 20°C and a relative humidity of 65% according to ASTM D 1434. Bonding strength was determined by measuring the tensile load required to tear off the laminate and calculating the unit stress in grams per centimeter.

EXAMPLE 1

85% of polyamide resins graded for a general molding purpose ("CM1011" nylon-6, and "CM3011" nylon-66; both made by Toray Industries, Japan) were dry-blended with 15% of ethylene copolymers as listed on Table I to form a granular mixture. Using the extrusion apparatus shown in FIG. 1, the mixture was fed into the extruder 1 wherein the mixture was melted and kneaded at temperatures of 220° to 280°C. The cylinder of the extruder had an inner diameter of 30 mm and an L/D ratio of 20.

A low density polyethylene, graded for blow-molding purposes, having a melt index of 0.3 and a density of 0.924 was fed into the extruder 3 wherein the polyethylene was heated and kneaded at temperatures of 180° to 280°C. The cylinder of the extruder 3 had an inner diameter of 40 mm and an L/D ratio of 18.

The composite polymer parison of a triple-wall structure extruded from the extrusion apparatus was shaped into a cylindrical bottle having a volume of approximately 500 ml by a conventional blow-molding apparatus. The bottle was composed of an outer laminate of 0.118 mm, a medial laminate of 0.022 mm and an inner laminate of 0.142 mm, all in thickness.

The bonding strengths of the three polymer laminates are shown in Table I. As seen from Table I, the incorporation of the ethylene copolymers improves the bonding strength. Particularly, ethylene copolymers containing metal salts of acrylic or methacrylic acid are preferable. Optimum results are obtainable with zinc acrylate or methacrylate.

Table I

| Specimen No. | Inner and outer laminates (Polyolefin) | Medial laminate (polyamide)+(ethylene copolymer) | Comonomer (% in copolymer) | Bonding strength (g/cm) Between outer and medial laminates | Between medial and inner laminates |
|---|---|---|---|---|---|
| 1 | | | — | 9.8 | 9.8 |
| 2 | | | Methacrylic acid (10) | 18.1 | 21.3 |
| 3 | | | Zinc *1 methacrylate | 123.5 | 130.5 |
| 4 | Low density poly-ethylene | Nylon-6 | Sodium *2 methacrylate | 107.3 | 118.4 |
| 5 | | | Lithium (10) | 67.8 | 74.9 |
| 6 | | | Acrylic acid (10) | 15.6 | 19.4 |
| 7 | | | Zinc acrylate (10) | 98.9 | 81.7 |
| 8 | | | Sodium acrylate (10) | 78.0 | 99.3 |
| 9 | | Nylon-66 | Zinc *1 methacrylate | 119.0 | 113.3 |

Note:
*1 Ionomer resin "Surlyn" A 1652, made by Du Pont, U. S. A.
*2 Ionomer resin "Surlyn" A 1560, made by Du Pont, U. S. A.

EXAMPLE 2

Nylon-6 similar to that used in Example 1 was dry-blended with an ethylene copolymer containing zinc methacrylate, graded for general molding purposes having a melt index of 4.4 and a density of 0.94 (Ionomer resin "Surlyn" A 1652, made by Du Pont) in various proportions as shown in Table 2 to form a granular mixture.

Using the extruding apparatus identical to that of Example 1 and following a procedure similar to that of Example 1, triple-walled cylindrical bottles of approximately 500 ml volume were manufactured from the above-mentioned nylon-6 mixture and a high density polyethylene, graded for blow-molding purposes, having a melt index of 0.3 and a density of 0.945. The bottles were comprised of an outer polyethylene laminate of 0.288 mm thickness, a medial nylon-6 mixture laminate of 0.055 mm thickness and an inner polyethylene laminate of 0.230 mm thickness.

Bodning strength between the laminates of each bottle was tested. Results are shown in Table II.

Table II

| Specimen No. | Amount of "Surlyn" A (%) | Bonding strength (g/cm) Between outer and medial laminates | Between medial and inner laminates |
|---|---|---|---|
| 1 | 0 | 9.8 | 9.8 |
| 2 | 3 | 28.0 | 25.4 |
| 3 | 5 | 32.4 | 39.1 |
| 4 | 10 | 52.8 | 55.6 |
| 5 | 20 | 63.4 | 78.3 |
| 6 | 30 | 97.5 | 101.3 |
| 7 | 40 | 120.1 | 123.5 |

As seen from Table II, bond strength increases with an increase in the amount of the ethylene copolymer to be blended with polyamide. The bottles had a bond strength sufficiently high for practical use, except for specimen No. 1. For example, when six bottles (specimen No. 2 through 7), each of which was filled with water and covered with a cap, were dropped from a height of 2 m, neither damage nor separation of the laminates was observed. Even when the bottles were dipped in a 30° to 80°C water bath, little or no reduction in bond strength was observed.

In contrast, when specimen bottle No. 1 was manually deformed, separation of the laminates occurred easily. The bottle had low impact strength. For example, when the bottle was dropped from a height of 1 m, it was broken partially at the pinched-off area thereof; and when dropped from a height of 2 m, the pinched-off area broke completely. Further, when the bottle was dipped in a 30° to 80°C water bath, separation between the laminates occurred easily.

EXAMPLE 3

Using the extruding apparatus identical to and following a procedure similar to that of Example 1, a cylindrical bottle with a triple-wall structure having a volume of approximately 500 ml was manufactured from a low density polyethylene graded for blow-molding purposes, with a melt index of 0.3 and a density of 0.924 and a mixture composed of 90% of nylon-6 similar to that used in Example 1 and 10% of an ethylene copolymer containing zinc methacrylate graded for general molding purposes, with a melt index of 4.4 and a density of 0.94 (Surlyn A 1652, made by Du Pont, U.S.A.). The bottle was composed of an outer polyethylene laminate of 0.21 mm thickness, a medial nylon-6 mixture laminate of 0.04 mm thickness and an inner polyethylene laminate of 0.20 mm thickness.

For comparison purposes, following the procedure mentioned above, a cylindrical bottle with a triple-wall structure composed of outer and inner nylon-6 mixture laminates and a medial polyethylene laminate was manufactured by feeding the mixture of nylon-6 and the Surlyn A into the extruder 3 and the low density polyethylene into the extruder 1, respectively. The thickness of the outer laminate was 0.026 mm of the medial laminate, 0.43 mm and of the inner laminate, 0.015 mm.

Further, following the procedure mentioned above, a cylindrical bottle with a double-wall structure composed of an outer nylon-6 mixture laminate and an inner polyethylene laminate was manufactured by feeding the mixture of nylon-6 and the Surlyn A into the extruder 1 and the low density polyethylene into the extruder 3 and shutting the outer annular passage formed between the die body 6 and the intermediate die member 7. The thickness of the outer laminates was 0.04 mm and of the inner laminate, 0.41 mm.

The oxygen gas transmission rate and bonding strength of the bottles were determined. Results are shown in Table III.

Table III

| Specimen No. | Composition of laminates | Oxygen gas transmission rate ($cm^3/m^2 \cdot 24 \ hr/atm$) | Bonding strength (g/cm) between medial and inner laminates |
|---|---|---|---|
| 1 | Outer LDPE*/medial nylon-6/inner LDPE | 33 | 100.7 |
| 2 | Outer nylon-6/medial LDPE/inner nylon-6 | 68 | 84.3 |
| 3 | Outer nylon-6/inner LDPE | 72 | 49.1 |

*LDPE = Low density polyethylene

As is apparent from Table III, the triple-wall structure of the invention (specimen No. 1) has an oxygen gas transmission rate less than one half that of the other triple-wall structure (specimen No. 2) and the double-wall structure (specimen No. 3), and a bonding strength greater than twice that of the double-wall structure.

EXAMPLE 4

Using the extruding apparatus identical to and following a procedure similar to that of Example 1, cylindrical bottles with a triple-wall structure, having a volume of approximately 500 ml, comprised of outer and inner polyethylene laminates and a medial nylon-6 mixture laminate, were manufactured from low and high density polyethylenes similar to those used in Examples 1 and 2, respectively and a mixture of nylon-6 and Surlyn A 1652, similar to that used in Example 3. The proportion of the polyethylene to the mixture of nylon-6 and the Surlyn A was varied.

Figure 3:
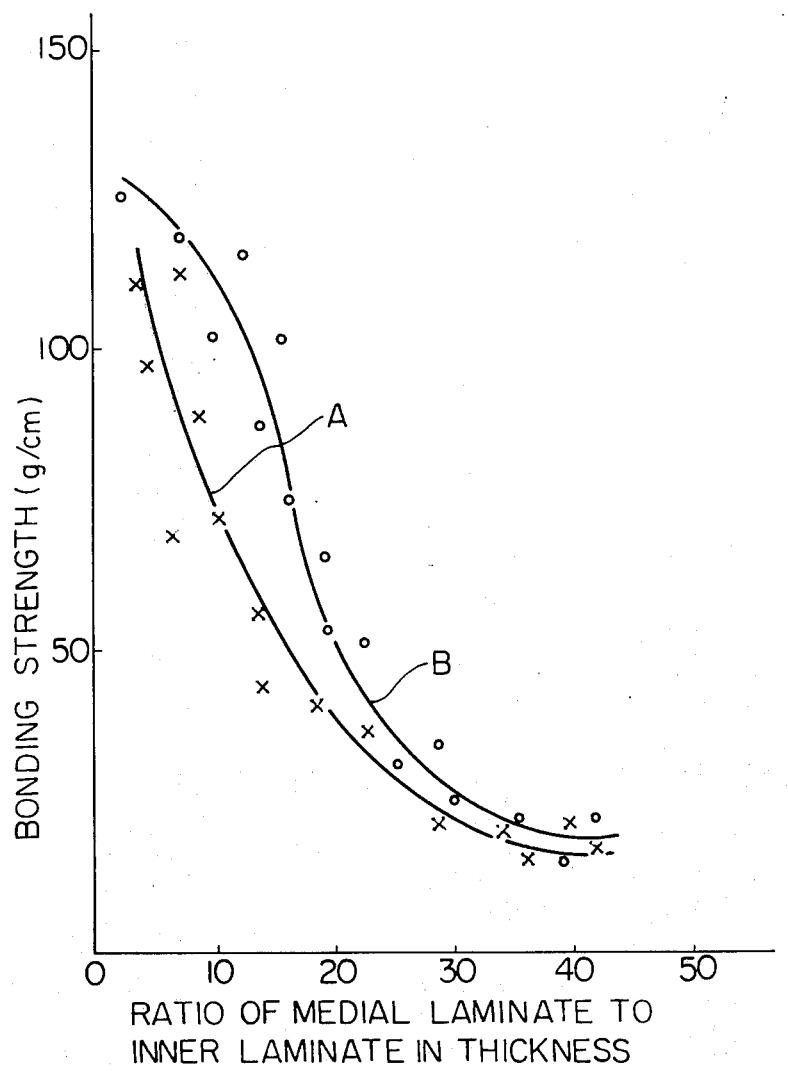
FIG. 3 is composed of graphs showing the dependence of the bonding strength between two adjacent laminates upon the thickness of the medial laminate.

The bonding strength between the inner polyethylene laminate and the medial nylon-6 mixture laminate of the bottles was determined. Results are shown in FIG. 3. In FIG. 3, the graphs show the dependence of the bonding strength between the medial nylon-6 mixture laminate and the inner polyethylene laminate upon the thickness ratio of the medial nylon-6 mixture laminate to the outer and inner polyethylene laminates of the bottles, wherein curves A and B correspond respectively, to the bottles having outer and inner high density polyethylene laminates and the bottles having outer and inner low density polyethylene laminates.

As seen from FIG. 3, the smaller the thickness ratio of the medial polyamide mixture laminate to the outer and inner olefin polymer laminates, the higher the bonding strength and, when the ratio is below approximately 30%, the bonding strength is extremely low.

Further, it has been proved that in the case where the thickness ratio of the medial polyamide laminate to the outer and inner olefin polymer laminates is great, e.g. exceeding 30%, the bonding strength cannot be noticeably enhanced even if the amount of the ethylene copolymer to be incorporated into polyamide is increased.

EXAMPLE 5

Using the extruding apparatus identical to and following a procedure similar to that of Example 2, cylindrical bottle with a triple-wall structure having a volume of approximately 500 ml was manufactured from high density polyethylene as the outer and inner laminates and a mixture of 90% of nylon-6 and 10% of the ethylene copolymer (Surlyn A 1652) as the medial laminate, wherein 15% of glass fibers, based upon the total weight of polyamide and the ethylene copolymer, 13 microns in diameter and 3,000 microns in length, were incorporated into the mixture of nylon-6 and the ethylene copolymer prior to feeding into the extruder. The thickness of the outer laminate of the bottle was 0.352 mm of the medial laminate, 0.047 mm and of the inner laminate, 0.280 mm. For comparison purposes, the above procedure was repeated wherein the glass fibers were not employed although all other conditions remained substantially the same.

The bonding strength of the bottle, was determined. Results are shown in Table IV.

Table IV

| Specimen No. | Glass fibers | Bonding strength (g/cm) | |
|---|---|---|---|
| | | Between outer and medial laminates | Between medial and inner laminates |
| 1 | Incorporated | 90.3 | 79.6 |
| 2 | Not incorporated | 68.0 | 55.3 |

As seen from Table IV, the incorporation of glass fibers into the medial laminate far improved the bonding strength.

It was also found that bonding strength can be similarly improved when glass fibers are incorporated into the olefin polymer to be formed as the outer and inner laminates instead of the polyamide mixture to be formed as the medial laminate.

EXAMPLE 6

Using the extruding apparatus identical to and following a procedure similar to that of Example 1, cylindrical bottles with a triple-wall structure having a volume of approximately 500 ml were manufactured from a low density polyethylene similar to that used in Example 2 and a mixture of nylon-6 and an ethylene copolymer, both similar to those used in Example 2, wherein nylon-6 and the ethylene copolymer were blended with each other in various ratios. The thickness of the outer laminate of the bottles was 0.22 mm of the medial laminate, 0.05 mm and of the inner laminate, 0.29 mm.

Figure 4:
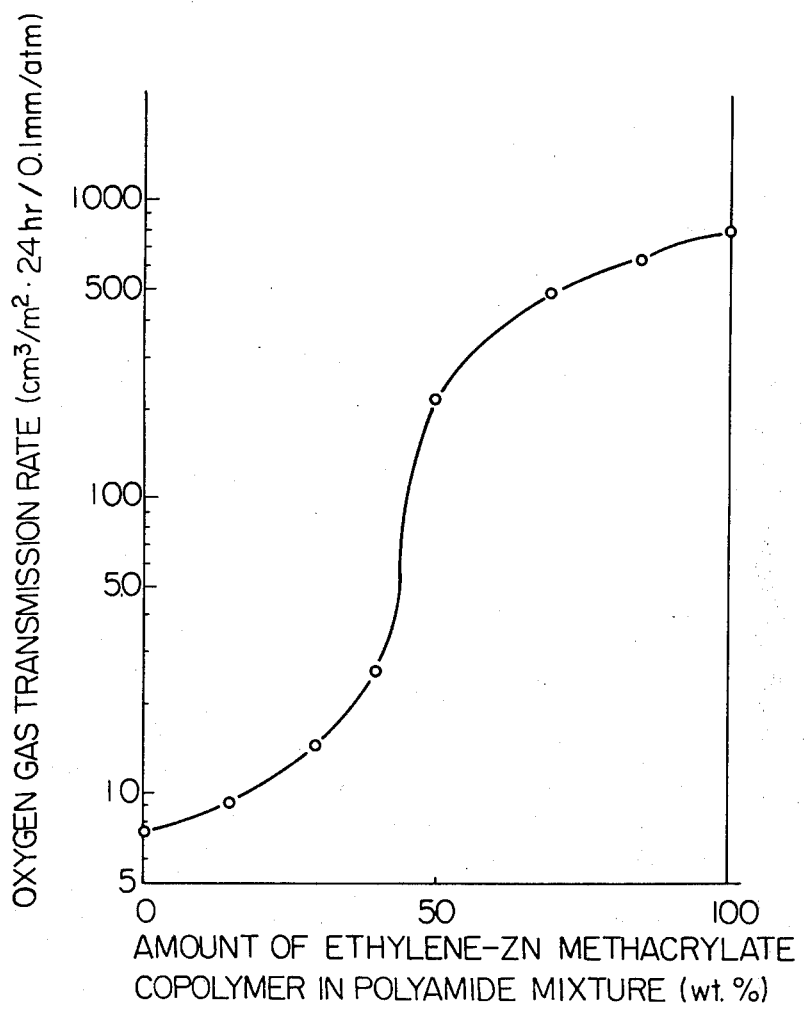
FIG. 4 is composed of graphs showing the dependence of the rate of oxygen gas transmission through the medial laminate of the container upon the proportion of the ethylene copolymer to polyamide.

The oxygen gas transmission rates through the medial laminate of the bottles were determined, and the results are shown in FIG. 4 in terms of oxygen gas transmission rates through a medial laminate of 0.1 mm thickness. As seen from FIG. 4, when the amount of the ethylene-zinc methacrylate copolymer is below approximately 45%, the gas transmission rate through the laminate is very low and nearly equal to that through a laminate comprised of only polyamide. In contrast, when the amount of copolymer exceeds approximately 50%, the gas transmission rate through the laminate is very high and nearly equal to that through a laminate comprised of only an olefin polymer. Therefore, the amount of the ethylene copolymer to be blended with polyamide should be at most 45% based on the weight of the blend.

EXAMPLE 7

Using the extruding apparatus identical to and following a procedure similar to that of Example 1, a cylindrical bottle (specimen No. 1) with a triple-wall structure having a volume of approximately 500 ml was manufactured from low density polyethylene similar to that used in Example 2 and a mixture of 90% of nylon-6 and 10% of the ethylene copolymer (Surlyn A 1652).

For comparison purposes, the above procedure was repeated wherein a die assembly having three conically disposed, annular orifices was employed instead of the die assembly shown in FIG. 1 and the three streams of the polymer melts were joined together after extrusion from the orifices thereby to manufacture a similar cylindrical bottle (specimen No. 2) with a triple-wall structure and a volume of approximately 500 ml.

The bonding strength of the bottles was determined. Results are shown in Table V.

Table V

| Specimen No. | Bonding strength (g/cm) | |
|---|---|---|
| | Between outer and medial laminates | Between medial and inner laminates |
| 1 | 98.1 | 100.7 |
| 2 | 4.3 | 4.6 |

As seen from Table V, the bonding strength is far superior in the case where the polymer melts are joined together within a die as compared with the case where the polymer melts are joined together after extrusion from a die.

What we claim is:

1. A process for manufacturing a thermoplastic polymer container having a triple-wall structure which comprises melt-extruding a composite plastic tube comprised of three closely adherent tubular laminates, the medial laminate being composed of a mixture of (i) 55 to 97% by weight of polyamide and (ii) 3 to 45% by weight of an ethylene copolymer containing 0.1 to 10% by mole, in polymerized form, of at least one compound selected from the group consisting of metal salts of acrylic acid and methacrylic acid, and the outer and inner laminates being composed of an olefin polymer, while the three independent streams of the polymer melts are joined together within a die such that the thickness of said medial laminate is 2 to 30% based on the total thickness of the three laminates; and then blow-molding the composite plastic tube into the shape of a container.

2. A process according to claim 1 wherein said medial laminate is comprised of a mixture of (i) 70 to 95% by weight of polyamide and (ii) 5 to 30% by weight of said ethylene copolymer.

3. A process according to claim 1 wherein said ethylene copolymer contains 0.1 to 10% by mole, in polymerized form, of zinc methacrylate.

4. A process according to claim 1 wherein the thickness of said medial laminate is 3 to 20% based on the total thickness of the three laminates.

5. A process according to claim 1 wherein said medial laminate has a thickness of more than 5 microns.

6. A process according to claim 1 wherein said olefin polymer to be formed into the outer and inner laminates is low or medium density polyethylene.

* * * * *

UNITED STATES PATENT OFFICE
CERTIFICATE OF CORRECTION

Patent No. 3,962,396  Dated June 8, 1976

Inventor(s) Katuya Ono, Koji Kozuka and Yoshiyuki Komuro

It is certified that error appears in the above-identified patent and that said Letters Patent are hereby corrected as shown below:

Column 3, line 25, delete "95%" and insert therefor --97%--

Column 4, line 13, after "maximum" insert --bonding--

Signed and Sealed this

Twenty-first Day of September 1976

[SEAL]

Attest:

RUTH C. MASON
*Attesting Officer*

C. MARSHALL DANN
*Commissioner of Patents and Trademarks*